United States Patent Office 3,326,954
Patented June 20, 1967

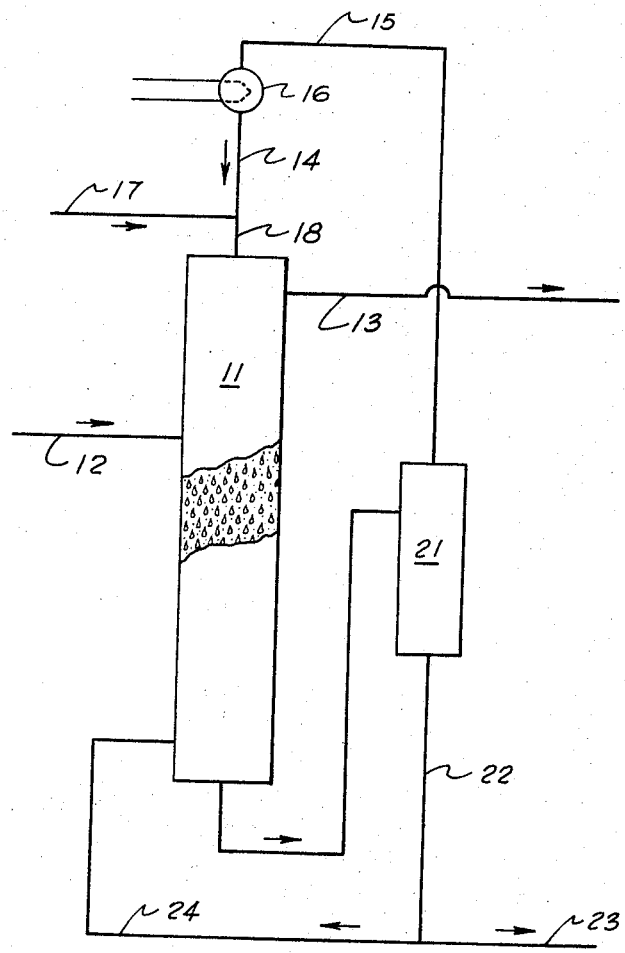

3,326,954
SEPARATION OF ALUMINUM ALKYL
COMPOUNDS
Marcelian F. Gautreaux, Baton Rouge, La., assignor to
Ethyl Corporation, New York, N.Y., a corporation of
Virginia
Filed July 12, 1962, Ser. No. 209,332
5 Claims. (Cl. 260—448)

Introduction

This invention relates to the manufacturer and recovery of organoaluminum compounds, particularly trialkyl aluminum compounds. More particularly, the invention relates to a new and improved process for the resolution and recovery of trialkylaluminum reaction mixtures, which mixtures are characterized by having a large number of individual alkyl group substituents present, said alkyl groups being of varying chain length or carbon atom content.

Prior art—Background—Problem

Trialkyl aluminum compounds have developed considerable interest in recent years, owing to new methods of synthesis therefor and to beneficial uses, such as in the manufacture of high polymer materials. It has also been known that trialkyl aluminum compounds can be employed to generate alcohols, said reaction involving firstly the formation of aluminum alcoholate compounds, e.g. $Al(OR)_3$ wherein R is an alkyl group, and the hydrolysis thereof to generate primary alcohols corresponding to the alkyl groups. It is immediately evident that an aluminum alkoxide mixture derived from a trialkyl aluminum compound wherein the alkyl groups widely vary in chain length, will exhibit the same variation in size of the alcohols resultant therefrom. It is also immediately apparent that unless a relatively specific product fraction, having recognized commercial utility, can be manufactured, that a large amount of unwanted alcohols will be produced. Accordingly, it has been highly desired that it be possible to readily manufacture trialkyl aluminum compounds in good yield, wherein the alkyl groups thereof are a limited range of radicals. In other words, illustratively, it has been desired to be able to produce a trialkyl aluminum compound having alkyl substituents of, for example, only ten to fourteen carbon atoms, twelve to sixteen, or the like. Unfortunately, however, in the synthesis of trialkyl aluminum compounds having the higher alkyl group present, no effective one-step procedure has yet been found whereby a tri-lower alkyl aluminum compound can be converted in quite high yields, or with great selectivity, to a specific tri-higher alkyl aluminum compound. When a tri-lower alkyl aluminum compound, such as triethyl aluminum, is reacted with ethylene under chain growth conditions, the resultant trialkyl aluminum product is a mixture of a large number of materials, and the alkyl group distribution follows a Poisson type distribution, on a mole basis.

Heretofore there has been no effective method, then, of either generating a trialkyl aluminum product stream having a limited number of desired alkyl groups present, nor has there been an effective procedure for the resolution of the obtainable chain-growth trialkyl aluminum products to isolate therefrom desired fractions.

Objects

The primary object of the present invention is to provide a new and improved technique for the resolution or separation of trialkyl aluminum compound mixtures into two or more portions, at least one portion having closely controlled and controllable molecular weight limits. Even more particularly, an object of the present invention is to provide a separation of trialkyl aluminum mixtures, wherein a separation is achieved which discriminates, in the separation, by the length of alkyl groups per se, rather than according to the average chain length, or the molecular weight, of the trialkyl aluminum molecular species or compounds, in the fractions obtained. Other objects will appear hereinafter.

General definition and description

In its most general form, the process of the present invention involves separating a trialkyl aluminum mixture, having the overall composition represented by the expression $R_3Al$, wherein R represents an alkyl group, with a fluorinated hydrocarbon maintained under liquid conditions, and dissolving in said fluorinated hydrocarbon liquid phase a portion only of the trialkyl aluminum, having alkyl aluminum moieties enriched in those of the lower alkyl groups. The two phases thus established are separated, and, normally, the fluorinated component from its phase is separated, usually by vaporization, providing a separated trialkyl aluminum fraction enriched in alkyl aluminum moieties having lower alkyl groups.

As indicated above, the feed material to the process can be identified either as a trialkyl aluminum feed, $R_3Al$, or as a mixture of alkyl aluminum moieties, $Ral$. The latter expression is particularly desirable for purposes of the present invention, because as already described, what is desired is a product having a limited range of alkyl aluminum groups or moieties, as the desired ultimate products derive their character from the individual alkyl groups, rather than from trialkyl aluminum molecular species. In addition, the higher alkyl products obtained by chain growing on tri-lower alkyl starting compositions is a material having numerous different alkyl groups present and the overall mixture can be considered a statistical distribution of all possible trialkyl aluminum components possible from the various alkyl groups present. In a simple situation, wherein a trialkyl aluminum mixture is established, containing ethyl and butyl groups, it will be seen that the resultant mixtures can be considered to contain triethyl aluminum, diethyl n-butyl aluminum, di-n-butyl ethyl aluminum, and tri-n-butyl aluminum. When the alkyl groups present are much more numerous, it is quite evident that the total number of individual trialkyl aluminum molecular species at any one time will be quite large. For example, if alkyl groups increasing in two carbon atom increments of from 2 to 30 carbon atom content, are present in the mixture, it is possible for several hundred different trialkyl aluminum compounds to be present.

The surprising feature of the present process, among others, is that it is now possible to separate such a complex trialkyl aluminum mixture by a resolution based upon alkyl groups, even though a trialkyl aluminum compound contains three such groups. Hence, it is highly desirable to consider the trialkyl aluminum streams involved as a mixture of alkyl aluminum moieties $Ral$, wherein R is an alkyl group and $al$ is one-third the atomic equivalent of aluminum. In other words, despite the existence in a feed mixture of an enormous number of compounds, it is nevertheless now possible to achieve a separation on the basis of the above illustrated alkyl aluminum moieties. In other words, in a specific feed mixture wherein, for example, a component may be present represented by the expression dioctyl tetradecyl aluminum $(C_8H_{17})_2(C_{14}H_{29})Al$ it is possible, to, in effect, split this compound and to separate out the tetradecyl aluminum moiety, $C_{24}H_{29}al$.

As already indictaed, the feed mixture of alkyl aluminum moieties is contacted with a fluorinated hydrocarbon. The fluorinated hydrocarbons are usually alkane hydrocarbon of up to four carbon atoms, although certain cyclic compounds are also included. The requisites of the fluorinated hydrocarbon for the process are that it should be inactive toward the trialkyl aluminum fed and components thereof, and that a two-phase system should be readily established under moderate conditions, which can include sub-ambient temperatures and elevated pressures. In general, the suitable fluorinated hydrocarbons appear to preferably contain from 1 to 3 fluorine atoms per carbon atom, and from 0 to 2 additional halogen per hydrocarbon compound, the additional halogen being selected from the group consisting of chlorine and bromine, the remaining substtiuents of the solvent compound being hydrogen substituents. Typical examples of fluorinated hydrocarbon derivatives suitable for the present process are:

| | Boiling point, °C. |
|---|---|
| Trifluoromethane | −83.1 |
| Chlorotrifluoromethane | −81.4 |
| Hexafluoroethane | −78.2 |
| Trifluorobromomethane | −57.8 |
| Difluorochloromethane | −40.8 |
| 1,1-difluoroethane | −24.0 |
| Octafluorocyclobutane | −6.0 |
| 1,1,2,2-tetrafluoro-1,2-dichloroethane | 3.6 |

Other compounds in addition to the above are quite operable. For example, tetrafluoromethane is suitable, but because of its quite low boiling point, −128° C. it is not commonly used.

The trialkyl aluminum feed, as stated, is contacted with the liquid fluorohydrocarbon and a portion dissolved therein as a separate phase. The phases are separated, the trialkyl aluminum dissolved in the solvent phase being enriched in the lower alkyl aluminum moieties. By fractional distillation, the solvent is then separated, the feed thus being resolved into the tri-lower alkyl aluminum fraction and the non-dissolved, or tri-higher alkyl aluminum fraction. Because of the high volatility of the solvents fluorohydrocarbons, the separation by distillation is relatively easy, and in many instances a simple flash vaporization is sufficient.

In most instances, a series of countercurrently arranged stages are utilized to obtain the desired separation, a typical apparatus layout being shown by the figure.

Description of typical apparatus

Referring to the figure, typical apparatus is shown in schematic arrangement for application of the present process. A contacting vessel or column 11 is provided for accomplishing intimate contact of a two-phase system, one phase being an alkyl aluminum rich system and the other phase being the fluorinated hydrocarbon rich phase. A feed line 12 is provided for introducing a feed of trialkyl aluminum constituents at an intermediate point in the height of the column 11. A bottoms line 20 receives the fluorinated hydrocarbon phase discharged from the column 11 and transmits it to a recovery column 21. The recovery vaporizer or column 21 is provided to allow at least partial vaporization of the fluorinated hydrocarbon solvent from the bottom fed through line 20. A vaporizer liquid outlet line 22 divides into a product line 23 and a liquid reflux line 24. A vapor line 15 from the vaporizer 21 passes to a condenser 16 wherein the vaporized fluorinated hydrocarbon is recondensed and discharged through line 14 for reuse as a solvent. A make-up line 17 provides for adding to the system replacement quantities of fluorinated hydrocarbons as required. Recompression of the vaporized solvent is usually required, by compress means, not shown, to facilitate reliquefaction.

An overhead product line 13 is provided to take a liquid phase, trialkyl aluminum portion from the top of the contacting column 11 and discharge it for further processing or use as such.

The normal ancillary equipment such as pumps, valves, and heat exchange surfaces are not shown in the figure.

In most instances, it will be necessary to provide for refrigeration of the system to assure maintenance of liquid phase of the chlorinated hydrocarbon solvent and solvent phase.

The details of operation of the invention will be more fully understood from the following working example.

The net feed to the separation operation, provided through line 12 is a trialkyl aluminum mixture obtained by the chain growth of ethylene on a tri-lower alkyl material, and having the following composition:

| Alkyl aluminum component: | Weight percent |
|---|---|
| $C_2$ | 1.3 |
| $C_4$ | 6.6 |
| $C_6$ | 17.8 |
| $C_8$ | 24.0 |
| $C_{10}$ | 27.5 |
| $C_{12}$ | 15.6 |
| $C_{14}$ | 5.4 |
| $C_{16}$ | 1.4 |
| $C_{18}$ | 0.26 |
| $C_{20}$ | 0.04 |

It will be seen that the foregoing stream "peaks" at the decyl aluminum moiety, $C_{10}H_{21}al$.

The solvent used in this operation is difluorochloromethane, and the total quantity provided to the column 11 is in the proportions of 9 parts by weight per part of trialkyl aluminum streams fed to the column. The solvent, however, enters the column 11 at three points in this operation, about one-fifth is combined with the net feed of trialkyl aluminum, by a mixing line, not shown, about 64 percent is fed to the top of the column, and about 15-16 percent is returned with the refluxed tri-lower alkyl stream in line 24.

The overhead tri-higher alkyl aluminum stream discharged as product through line 13 has the following composition:

| Alkyl aluminum, component: | Weight, percent |
|---|---|
| $C_8$ | 0.2 |
| $C_{10}$ | 15.7 |
| $C_{12}$ | 56.5 |
| $C_{14}$ | 21.0 |
| $C_{16}$ | 5.3 |
| $C_{18}$ | 1.0 |
| $C_{20}$ | 0.2 |

Accompanying the tri-higher alkyl aluminum stream of the above composition are minor quantities of the difluorochloromethane solvent, in proportions of about 60 weight percent. This solvent dissolved in the trialkyl aluminum is readily recovered by simple vaporization operations, thereby leaving a product stream having over 98 percent alkyl aluminum components of the $C_{10-16}$ range.

The bottoms stream discharged from the column 11 by line 20 contains tri-lower alkyl aluminum components having the following composition:

| Alkyl aluminum, component: | Weight, percent |
|---|---|
| $C_2$ | 1.8 |
| $C_4$ | 9.0 |
| $C_6$ | 24.2 |
| $C_8$ | 32.3 |
| $C_{10}$ | 31.7 |
| $C_{12}$ | 1.4 |

These lower alkyl aluminum moieties are in solution in the difluorochloromethane at a concentration of about 36 weight percent.

The column operates at a pressure of about 200 pounds per square inch, with a bottom temperature of 14° F. and a top temperature of 104° F.

The foregoing illustrates the highly effective separation attained by the present process. In the foregoing operation, a total of about 80 contacting stages is provided in the column. Instead of a packed column as shown, other more efficient liquid-liquid contactors are preferably used, such as rotating disc contactors or columns of the Schiebel type.

When similar operations are carried out, but using other fluorohydrocarbons, and making appropriate adjustment of operating conditions, similarly effective separations are achieved. Likewise, the separation can be altered according to characteristics of the trialkyl aluminum feed and/or the desired product stream. Thus, by increasing the proportions of solvent above those used in the above example, the tri-higher alkyl aluminum stream discharged through line 13 can have the proportion of decyl aluminum moieties drastically reduced.

As heretofore mentioned, a particular and surprising benefit of the present invention is the separation of the feed mixture into fractions wherein the concentration of the alkyl aluminum moieties in the two fractions exhibits a resolution greatly in excess of the separation achievable by a perfect separation of trialkyl aluminum molecular species as shown by the following example.

In this operation a trialkyl aluminum feed stream was subjected to extraction in a perforated plate column, again using difluorochloromethane as the extracting liquid. The conditions were as follows:

Pressure _____ p.s.i.g__ 175
Temperature:
  Top _____ ° C__ 30
  Middle _____ ° C__ 20
  Bottom _____ ° C__ 3

The fluorinated hydrocarbon solvent was fed in proportions of about 32 parts by volume per part of fresh feed, and the recycle was about ¾ parts returned through line 24 per part discharged through line 23.

The compositions of the feed, bottoms and overhead streams were as follows:

| Alkyl aluminum component | Composition, Weight Percent | | |
|---|---|---|---|
| | Feed | Lower alkyl aluminum fraction | Higher alkyl aluminum fraction |
| $C_4$ | 10.5 | 12 | 0.3 |
| $C_6$ | 27.3 | 33.3 | 2.2 |
| $C_8$ | 24.3 | 32.5 | 9.6 |
| $C_{10}$ | 19.3 | 16.5 | 25 |
| $C_{12}$ | 11.0 | 4.7 | 28.4 |
| $C_{14}$ | 4.8 | 0.9 | 17.6 |
| $C_{16}$ | 2.0 | 0.0 | 9.7 |
| $C_{18}$ | 0.6 | 0.0 | 4.2 |
| $C_{20}$ | 0.2 | 0.0 | 1.6 |

The foregoing actual separation was compared with the results which would be obtained if an absolutely perfect separation based on molecular species were realized, as described below.

A separation by molecular species is premised on the molecular weight of the trialkyl aluminum components, regardless of the individual alkyl groups therein. Thus, for example, in making a split between trialkyl aluminum compounds, in the feed, having 36 and less carbon atoms, and 38 and more carbon atoms, the lower molecular weight fraction can have appreciable amounts of alkyl groups having chain lengths of greater than 36/3 or 12 carbon atoms. Thus, for example, dioctyl eicosyl aluminum, didecyl hexadecyl aluminum, octyl, decyl octadecyl aluminum all have the same molecular weight, or total number of carbon atoms, as tridodecyl aluminum. Higher alkyl groups then will appear in the low molecular weight fraction and low alkyl groups will appear in the high molecular weight fraction. The following table shows typical ratios of specific alkyl aluminum groups, when the separation is a perfect separation of molecular species, contrasted with the same ratios obtained by the foregoing example.

| Weight Ratio: Alkyl aluminum group in heavy fraction/ alkyl aluminum group in light fraction | | |
|---|---|---|
| Alkyl aluminum component | Perfect separation of molecular species | Above example |
| $C_4$ | 0.07 | 0.0064 |
| $C_8$ | 0.32 | 0.095 |
| $C_{14}$ | 3.9 | 6. |
| $C_{16}$ | 10.2 | 16 |

From the foregoing, it is seen that the separation achieved above provides an unanticipated benefit in that, for example, the tetradecyl aluminum moieties are actually concentrated in the higher chain length fraction to an extent of about 60 percent greater than would be obtainable by a perfect separation of molecular species.

Having described the process of the present invention fully, what is claimed is:

I claim:

1. A process for effecting a separation of trialkyl aluminum compounds from a trialkyl aluminum system, the system being characterized by having a plurality of individual alkyl substituents present, these substituents differing in carbon atoms content in the range of from 2 to about 30, which process comprises:

contacting the trialkyl aluminum mixture with a fluorinated hydrocarbon having at least one fluorine atom per carbon atom, and from zero to two halogens selected from the group consisting of chlorine and bromine, said fluorinated hydrocarbon being, in liquid condition, a better solvent for lower trialkyl aluminum compounds than for higher trialkyl aluminum compounds in the range of the carbon atom content of the trialkyl aluminum system, and being capable of forming a two-phase liquid system with said trialkyl aluminum system; forming such a two-phase liquid system and thereby dissolving a portion of the trialkyl aluminum mixture in said fluorinated hydrocarbon, the dissolved portion being enriched in R$al$ moieties having lower alkyl groups, said fluorinated hydrocarbon being characterized by freedom from reactivity with the trialkyl aluminum feed and components thereof, separating the fluorinated hydrocarbon containing the dissolved portion from the undissolved portion, and separating the fluorinated hydrocarbon from the dissolved portion.

2. The process of claim 1 performed in a plurality of stages wherein enrichment greater than that provided by a single stage is obtained.

3. The process of claim 1 in which the fluorinated hydrocarbon is difluorochloromethane.

4. The process of claim 1 in which the fluorinated hydrocarbon is difluorochloromethane and is utilized in the proportion of about 9 parts per part of trialkyl aluminum.

5. The process of claim 1 in which the fluorinated hydrocarbon is difluorochloromethane, and the trialkyl aluminum system contains a mixture of moieties having from about 2 to about 20 carbon atoms.

References Cited
UNITED STATES PATENTS
3,042,696   7/1962   Aldridge _____ 260—448

FOREIGN PATENTS
811,976   4/1959   Great Britain.

TOBIAS E. LEVOW, *Primary Examiner.*